Feb. 9, 1932.   C. K. KNIGHT   1,844,127
WINDSHIELD CLEANER
Filed March 22, 1927

INVENTOR
Charles Kelley Knight
By W. W. Williamson Atty.

Patented Feb. 9, 1932

1,844,127

UNITED STATES PATENT OFFICE

CHARLES KELLEY KNIGHT, OF UPPER DARBY, PENNSYLVANIA

WINDSHIELD CLEANER

Application filed March 22, 1927. Serial No. 177,301.

My invention relates to new and useful improvements in a wind shield cleaner, the primary object of which is to provide means for heating the surface over which the cleaner operates in order to melt any accumulations of ice or snow, or prevent such accumulations, the heating portion thereof being assisted by a squeegee in removing the snow or ice accumulations after the latter have been reduced to the form of moisture.

Another object of the invention is to provide a wind shield cleaner including a heating element and a squeegee, scraper or the like as a unitary structure.

A further object of the invention is to provide a wind shield cleaner which includes a wiping element and associated heating device, which latter may be constructed for removal when desired.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which.

Figure 1:
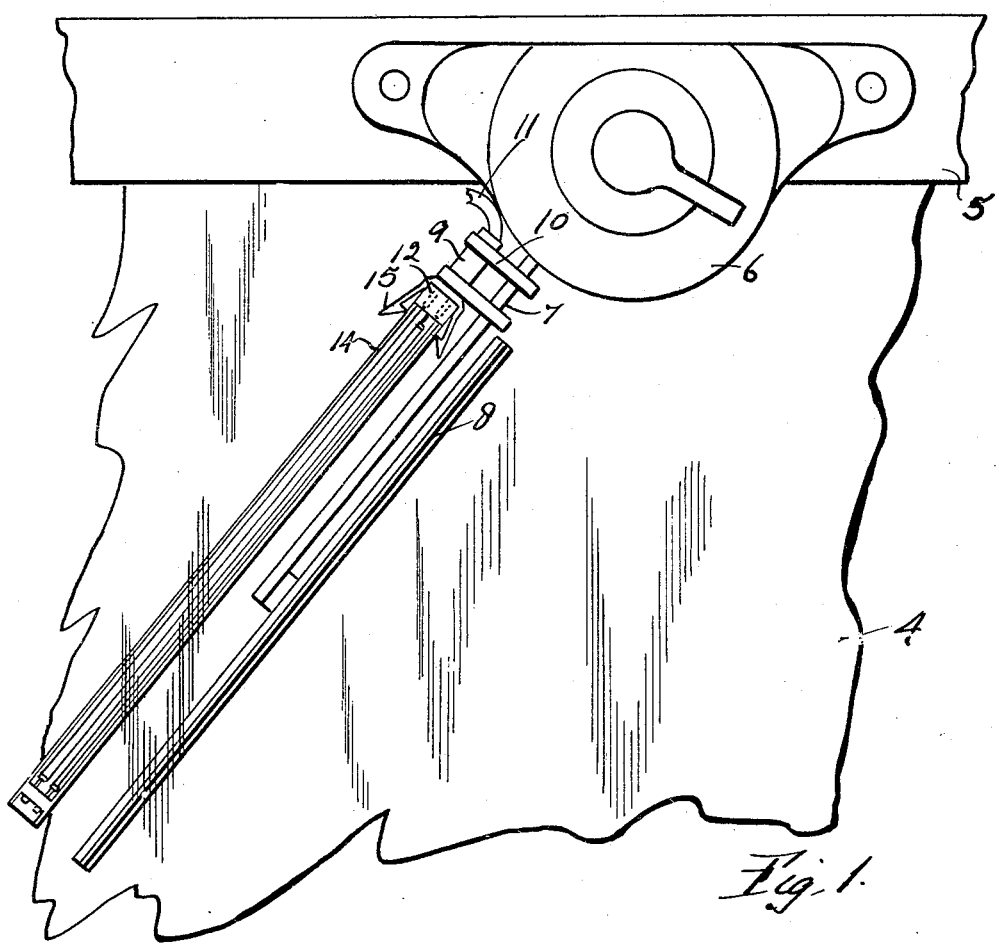
Fig. 1 is a front elevation of a wind shield cleaner embodying my invention and showing it attached to a wind shield, when looking at the inside thereof.
Figure 2:
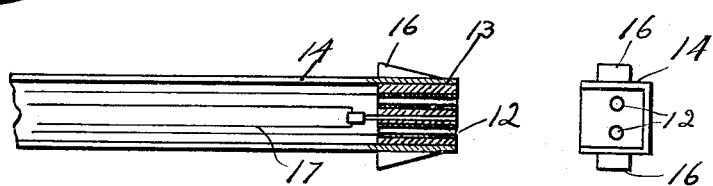
Fig. 2 is an enlarged fragmentary front elevation of the heater with a portion of the socket end broken away and shown in section to illustrate details of construction.
Figure 3:
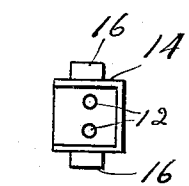
Fig. 3 is an end view of the same.

In carrying out my invention as herein embodied, 4 represents the glass portion of an automobile wind shield which is suitably glazed in a frame 5. On the said frame 5 is generally mounted the actuating portion 6 of a wind shield cleaner, and said actuating portion may be an electrically, vacuum, manually or otherwise operated device to which is connected an arm 7 for reciprocation across the front facing of the glass part of the wind shield, and said arm carries a wiper 8, such as a squeegee or rubber or other suitable construction, whereby accumulations or moisture may be wiped from the surface of the glass over which it is moved.

It is a well known fact that during a sleet storm, the rain striking the wind shield glass freezes and prevents the driver of the automobile from seeing the road, and the driver's vision is often times decreased even during foggy spells, during which times the wind shield cleaner is of little or no use because the accumulations cannot be removed thoroughly quickly enough.

I have found that by providing means to apply a sufficient amount of heat to the wind shield glass, ice and snow can be melted, and the glass maintained at a sufficient temperature to melt any accumulations of ice or prevent formation of ice thereon, as well as assisting the wiper in drying the surface.

One method of applying the necessary heat is to provide an electrical connector plug 9 attached by brackets or clamps 10 to the arm 7 of the wind shield cleaner, said connector plug being connected by a conductor cord 11 with a suitable source of electrical energy, such as a storage battery of the automobile, a generator or the like. The connector plug is provided with the usual terminals 12 for registration with sockets 13 in one end of the heater which includes a box-like body 14 of suitable material, having one open side which lies toward the outer surface of the wind shield glass when in use.

In order to make the body 14 detachable from the connector plug, the latter may be provided with spring catches 15 to latch over the lugs 16 on the body 14 when the latter is forced between the catches, to cause the terminals 12 to register with the sockets 13.

The body 14 may be of any desirable material, but preferably includes suitable heat insulating material, such as asbestos to prevent undue waste of the heat generator therein by means of a resistance element 17, here shown as a wire carried back and forth between suitable supports, and the ends connected with the sockets 13. Of course it will be obvious that a switch may be used in connection with the current supply so that said current may be turned off or on as desired.

Of course I do not wish to be limited to the exact details of construction as herein shown as these may be varied within the limits of the appended claims without departing from the spirit of my invention.

Having thus fully described my invention what I claim as new and useful is:

1. A wind shield cleaner, having, in combination, a wiper for reciprocation across a wind shield, an arm by which the wiper is carried, a connector plug, means to mount the plug on said arm, a heating device adapted to move with the wiper, and means to detachably connect the heating device with the connector plug.

2. A wind shield cleaner including an arm and a wiper carried thereby, a connector plug attached to said arm and connected with a source of electrical energy and a heating element adapted to move with the wiper and parallel thereto and detachably connected to the connector plug for operation on the same surface as the wiper but independent of the latter.

In testimony whereof, I have hereunto affixed my signature.

CHARLES KELLEY KNIGHT.